(12) United States Patent
Gidon

(10) Patent No.: US 7,593,309 B2
(45) Date of Patent: Sep. 22, 2009

(54) METHOD FOR RECORDING DATA AND DEVICE FOR CARRYING OUT THE SAME COMPRISING A DEFORMABLE MEMORY SUPPORT

(75) Inventor: Serge Gidon, La Murette (FR)

(73) Assignee: Commissariat A l'Energie Atomique, Paris (FR)

( * ) Notice: Subject to any disclaimer, the term of this patent is extended or adjusted under 35 U.S.C. 154(b) by 626 days.

(21) Appl. No.: 10/561,169

(22) PCT Filed: Jun. 30, 2004

(86) PCT No.: PCT/FR2004/001677

§ 371 (c)(1),
(2), (4) Date: Dec. 16, 2005

(87) PCT Pub. No.: WO2005/013270

PCT Pub. Date: Feb. 10, 2005

(65) Prior Publication Data

US 2006/0176353 A1    Aug. 10, 2006

(30) Foreign Application Priority Data

Jul. 3, 2003    (FR)    ................................. 03 08134

(51) Int. Cl.
*G11B 9/00*    (2006.01)
(52) U.S. Cl. ...................... 369/126; 369/127
(58) Field of Classification Search ........................ None
See application file for complete search history.

(56) References Cited

U.S. PATENT DOCUMENTS 6,218,086 B1    4/2001    Binnig et al.
6,542,400 B2 *    4/2003    Chen et al. ................... 365/151
7,002,820 B2 *    2/2006    Chen et al. ..................... 365/34

FOREIGN PATENT DOCUMENTS

| EP | 0 887 794 A1 | 12/1998 |
| WO | WO 97/44780 | 11/1997 |
| WO | WO 02/078005 A2 | 10/2002 |

OTHER PUBLICATIONS

Vettiger et al., "The 'Millipede'—More Than One Thousand Tips for Future AFM Data Storage," IBM J. Res. Develop., vol. 44, No. 3, pp. 323-340, May 3, 2000.

* cited by examiner

*Primary Examiner*—Wayne R Young
*Assistant Examiner*—Adam R Giesy
(74) *Attorney, Agent, or Firm*—Oliff & Berridge, PLC

(57)    ABSTRACT

The recording device comprises a network of micro-points (6), with tips of nanometer scale, fixed to the same substrate (7). Said network of micro-points cooperates with a deformable memory support (1), which absorbs the range of differing heights of the micro-points (6) on bringing the network into contact with the memory support, before thermal, electrical, and/or mechanical recording of data. The memory support (1) comprises a stack with at least one deformable memory layer, arranged on a substrate (4). The deformable memory layer may be embodied by the stacking of a memory layer (2) and a flexible layer (3), the latter being arranged on the substrate (4). The memory layer (2) can be covered by a layer (5) interfacing with the micro-points (6). The pressure of a micro-point (6) on the memory support (1) induces a progressive deformation of the stack up to the flexible layer (3).

16 Claims, 1 Drawing Sheet

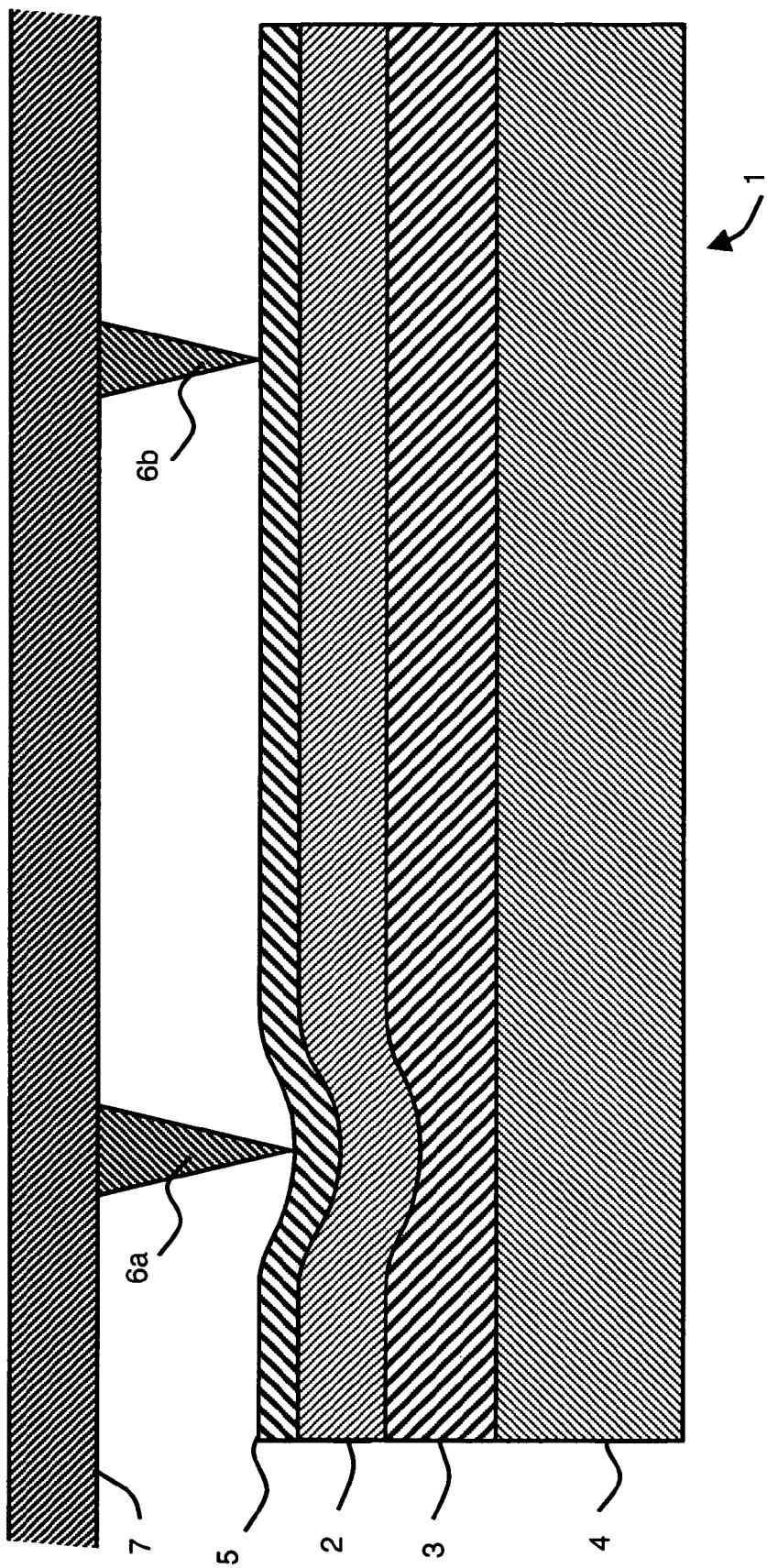

METHOD FOR RECORDING DATA AND DEVICE FOR CARRYING OUT THE SAME COMPRISING A DEFORMABLE MEMORY SUPPORT

BACKGROUND OF THE INVENTION

The invention relates to a method for recording data by means of an array of micro-tips arranged in a plane facing a memory support, comprising a stack of thin layers with at least one deformable memory layer. This method comprises data recording by selective actuation of the micro-tips.

The invention also relates to a device for recording data for implementation of the method for recording.

STATE OF THE ART

Data recording, both in the computing field and in the multimedia field, has to meet an increasing need for capacity. Different techniques have been developed ranging from the magnetic hard disk to the DVD using optics and phase change materials. Whatever the recording technique used, it is always sought to reduce the size of the memory points (bits) and increasing the recording capacity necessarily means increasing the storage density.

Recently, very large storage capacities, of about a Terabit/$cm^2$, have been obtained by implementing micro-tips of the type used in the tip effect microscopy field ("The Millipede—More than one thousand tips for future AFM data storage", P. Vettiger et al., IBM J. RES. Develop., Vol. 44, no 3, May 2000, p. 323-340 and "Fabrication of microprobe array with sub-100 nm nano-heater for nanometric thermal imaging and data storage", Dong-Weon Lee et al., Technical Digest, MEMS 2001, $14^{th}$ IEEE International Conference on Micro Electro Mechanical Systems (Cat. No 01CH37090), IEEE, Piscataway, N.J., USA, 2001, p. 204-207). High density is obtained by localizing the bits by means of micro-tips having an apex of nanometric scale. The micro-tips are preferably arranged in a two-dimensional array, with parallel access to the data, which enables excellent performances to be achieved as far as capacity is concerned. A single actuator, which may be electromechanical, enables a relative monolithic movement of the whole micro-tip array with respect to the surface of the storage medium constituting the memory support. Writing is then performed thermo-mechanically.

In such a data recording device, with tip effect, a perfect contact of all the tips with the storage medium has to be guaranteed. For reasons of complexity of the system, it can not be envisaged to control the position of each micro-tip individually. The micro-tips are however fabricated in collective manner, by techniques derived from those of microelectronics, and a dispersion of the height of the micro-tips always remains due to fabrication. Although this dispersion is very small, typically about 100 nm, the longest of the micro-tips of an array presses more than the others on the memory support.

To overcome this difficulty, each micro-tip is borne overhanging by one end of a cantilever, in similar manner to the micro-tip arrays used in local probe microscopy. The flexibility of the cantilever then enables the strain of a bearing to be absorbed.

The documents WO-A-97/44780, EP-A-887794 and U.S. Pat. No. 6,218,086 also describe recording devices wherein each micro-tip is arranged at the end of a cantilever. Simply placing the micro-tip and the memory support in contact causes bending of the cantilever enabling the heightwise dispersion of the micro-tips to be partially compensated. To record an item of information, a local deformation of the memory support is caused either thermally or mechanically.

However, the bearing forces of the micro-tips on the memory support must not exceed a value of about 100 nN for example, so as not to damage the memory support. Indeed, as the contact surface of a micro-tip with the storage medium is minute, the pressure is high. The cantilevers therefore have to be very flexible to absorb the heightwise dispersion of the micro-tips. For example, cantilevers having a stiffness of about 1 N/m, a length of 100 μm, a width of a few tens of micrometers and a thickness of a few micrometers have been developed.

It is difficult to envisage more flexible cantilevers. Their dimensions are in fact difficult to master due to their large length in comparison with their small width and/or thickness. In addition, the precision of positioning of the tips facing the surface of the memory support would be adversely affected, thus limiting the memory density.

OBJECT OF THE INVENTION

The object of the invention is to achieve a method and a device for data recording not presenting the above shortcomings and more particularly enabling the heightwise dispersion of the micro-tips to be ignored.

According to the invention, this object is achieved by a method and a device according to the accompanying claims.

A method for recording according to the invention is more particularly characterized by the fact that, the micro-tips being fixed directly onto one and the same support substrate, the method comprises bringing the array of micro-tips and the memory support into contact with a predetermined pressure, before selective actuation of micro-tips for data recording, said pressure enabling the dispersion of the dimensions of the micro-tips of the array of micro-tips to be absorbed by the deformable memory layer.

A device for implementing the method according to the invention comprises an array of micro-tips arranged in a plane facing a memory support, comprising a stack of thin layers with at least one deformable memory layer, means for absorbing the dispersion of the dimensions of the micro-tips of the array and means for recording by selective actuation of the micro-tips. This device is characterized in that the deformable memory layer constitutes said means for absorbing when the memory support and the micro-tip array are brought into contact, at said predetermined pressure, the micro-tips, with tips of nanometric dimension, being fixed directly onto one and the same support substrate.

BRIEF DESCRIPTION OF THE DRAWINGS

Other advantages and features will become more clearly apparent from the following description of particular embodiments of the invention given as non-restrictive examples only and represented in the accompanying drawing, in which the single FIGURE schematically illustrates a particular embodiment of a device for recording data according to the invention.

DESCRIPTION OF A PARTICULAR EMBODIMENT

The array of micro-tips of a data recording device according to the invention comprises a plurality of micro-tips 6 fixed directly, i.e. without cantilevers, to the same substrate 7. The micro-tips are therefore securely fixed to the substrate 7, which is preferably rigid.

Before selective actuation of the micro-tips for recording the data, the support substrate 7 of the micro-tips 6 is moved in the direction of the memory support 1 so as to bring simultaneously all the micro-tips 6 into contact with the memory support 1 at a predetermined pressure. The deformable memory support 1 is designed to absorb the heightwise dispersion of all the micro-tips 6 securedly fixed to a substrate 7 acting as support for the latter.

In the FIGURE, only two micro-tips 6a and 6b, securedly fixed to the substrate 7, are represented. Their height difference is exaggerated in the FIGURE so as to clearly illustrate the operating principle of the device. Thus, whereas the micro-tip 6b comes into contact with the memory support 1 without deforming the latter, the micro-tip 6a, which is longer, locally causes a small deformation of the memory support 1. The pressure exerted by the longer micro-tip is then insufficient to cause a deformation representative of a data to be recorded.

Data recording is subsequently performed, in conventional manner, by selective actuation of the micro-tips. Selective actuation of the micro-tips, designed for recording data, can be of thermal, electrostatic and/or mechanical type so as to form marks (corresponding for example to changes of state, deformations, etc.) at preselected memory locations. In the case where recording selectively causes a local deformation of the membrane, for example by pressure, the pressure exerted must then be substantially greater than the pressure exerted by the micro-tips when the micro-tips of the array and the memory support are brought into contact.

The deformations of the deformable memory layer 1 enabling the dispersion of the micro-tips to be absorbed when the micro-tip array and the memory support are brought into contact are much smaller than the marks that may be caused, thermally, electrically or mechanically, when recording of the data is performed.

As represented in the FIGURE, the memory support 1 is preferably formed by a stack of thin layers comprising at least one deformable memory layer deposited on a substrate 4.

The deformable memory layer can be formed by a flexible memory layer or, as represented in the FIGURE, by a stack of one memory layer 2 and one flexible layer 3, the latter being deposited on the substrate 4. An interface layer 5 with the micro-tips 6 can cover the memory layer 2. When the micro-tip array and the memory support 1 are brought into contact, a micro-tip 6a pressing on the memory support 1 then results in a progressive deformation of the stack up to the flexible layer 3. This progressive deformation is a function of the hardness and thickness of the different layers. The constitution and thickness of the different layers of the stack are adapted to the functionalities sought for and, in particular, to the recording mode chosen (thermal, electrical, etc.).

The flexible layer 3 can be formed by a polymer layer. For example, it can be formed by photosensitive resin, in particular photoresist used in microelectronics in lift-off type removal processes. It can also be formed by a glue of controlled hardness or by a layer of PDMS type elastomer silicon. The flexible layer 3 is preferably deposited on the substrate 4 by spin coating or by spray. Its thickness depends on the flexibility sought for and can for example be about a few micrometers or even less if necessary.

The substrate 4 can be made from silicon or a possibly flexible plastic material, for example polymethyl methacrylate (PMMA). In this case, its flexibility can contribute to the flexibility of the stack forming the memory support 1 and its thickness can be reduced to less than one millimeter.

The constitution of the memory layer 2 depends on the data recording method chosen. This layer can notably be made from polymer or a phase change material, either insulating or conducting. In all cases, the memory layer has to be as thin as possible to preserve the required flexibility of the memory support. It thus generally has a thickness of less than one micrometer. It can for example be deposited by PVD, for example by cathode sputtering, by PECVD or by spin coating on the flexible layer 3.

If the write process chosen is an electric write process, it may be necessary to make the flexible layer 3 conducting. This can in particular be achieved by the choice of a conducting polymer material, by addition of an additive in the initially insulating material or by interposing an additional conducting layer (not shown) between the memory layer 2 and the flexible layer 3. Such an additional conducting layer can for example be a layer of carbon of a nature suitable for conduction and of small thickness (a few tens of nanometers).

The constitution of the interface layer 5 is designed to facilitate interaction of the micro-tips 6 and of the memory support. For example, the interface layer 5 can be made from carbon, polymer, etc. Whatever its nature, it will have to be as thin as possible so as not to rigidify the memory support 1.

The invention claimed is:

1. A method for recording data by means of an array of micro-tips arranged in a plane facing a memory support including a stack of thin layers with at least one deformable memory layer, the method comprising:
   data recording by selective actuation of the micro-tips, the micro-tips being fixed directly onto one and the same support substrate;
   bringing the array of micro-tips and the memory support into contact with a predetermined pressure, which is insufficient to cause a deformation representative of a data to be recorded, before the selective actuation of the micro-tips for data recording, said pressure enabling the dispersion of heights of the micro-tips of the array of micro-tips to be absorbed by the deformable memory layer.

2. The method according to claim 1, wherein data recording is of electric type.

3. The method according to claim 1, wherein data recording is of thermal type.

4. A recording device for implementation of the method according to claim 1, comprising:
   means for absorbing the dispersion of the heights of the micro-tips of the array; and
   means for recording by the selective actuation of the micro-tips,
   wherein the deformable memory layer constitutes said means for absorbing when the memory support and the array of micro-tips are brought into contact, at said predetermined pressure, which is insufficient to cause a deformation representative of a data to be recorded,
   the micro-tips, having an apex of nanometric dimension, being fixed directly onto one and the same support substrate.

5. The device according to claim 4, wherein the memory layer is deposited on a flexible layer deposited on the substrate.

6. The device according to claim 5, wherein the flexible layer is made of polymer.

7. The device according to claim 6, wherein the flexible layer is made of photoresist.

8. The device according to claim 5, wherein the flexible layer is a glue of controlled hardness.

9. The device according to claim 5, wherein the flexible layer is made of elastomer silicone.

10. The device according to claim 5, wherein the flexible layer has a thickness of about a few micrometers.

11. The device according to claim 5, wherein the flexible layer is conducting.

12. The device according to claim 5, further comprising:
an additional conducting layer between the memory layer and the flexible layer.

13. The device according to claim 4, wherein the memory layer has a thickness of less than one micrometer.

14. The device according to claim 4, further comprising:
an interface layer with the micro-tips, covering the memory layer.

15. The device according to claim 4, wherein the substrate is made of silicon.

16. The device according to claim 4, wherein the substrate is made of plastic material with a thickness of less than one millimeter.

* * * * *